July 18, 1961 W. G. BURT, JR 2,992,561
FORCE MEASURING INSTRUMENT
Filed Jan. 7, 1958 2 Sheets-Sheet 1

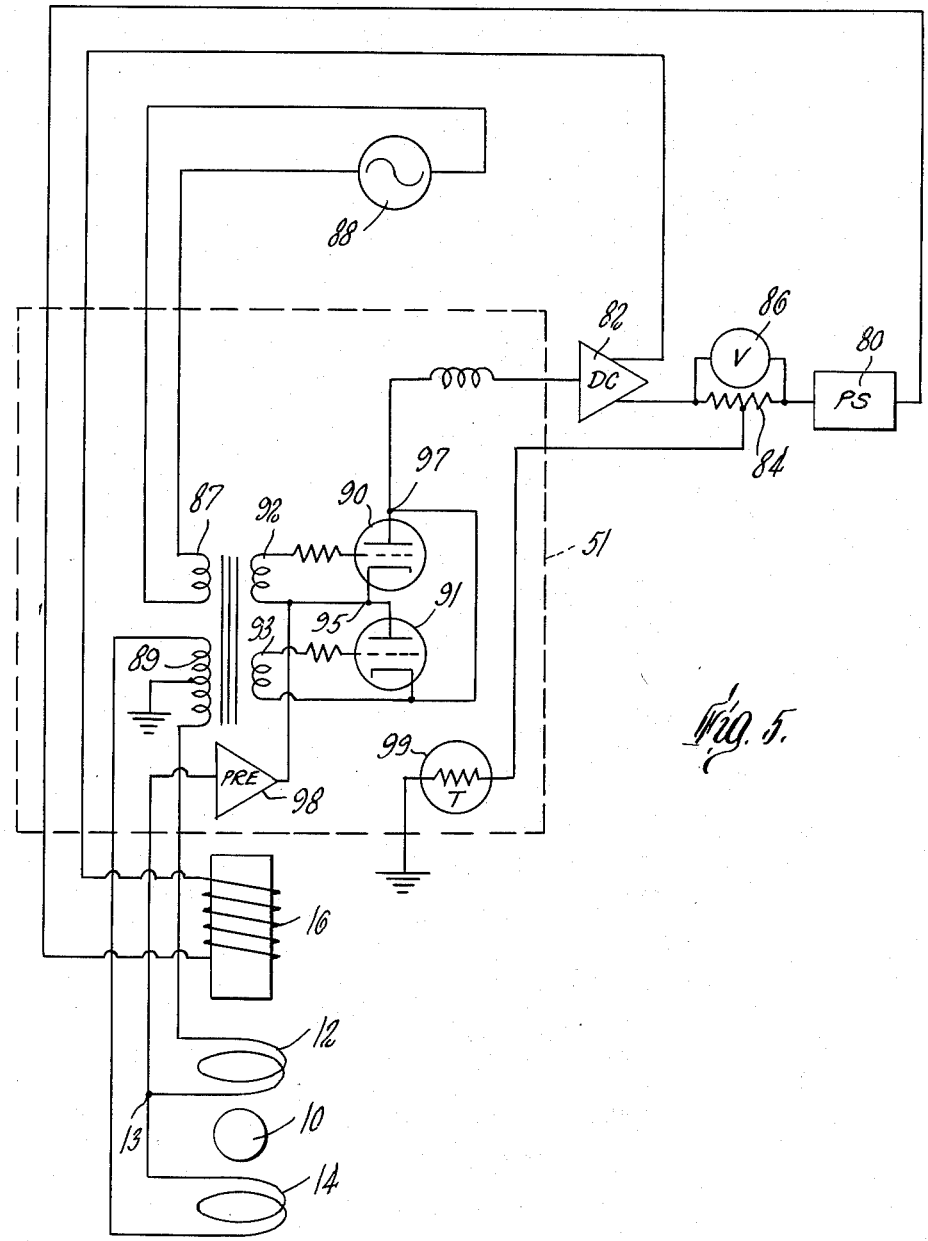

United States Patent Office 2,992,561
Patented July 18, 1961

2,992,561
FORCE MEASURING INSTRUMENT
William G. Burt, Jr., Weston, Mass., assignor to General Communication Company, Boston, Mass., a corporation of Massachusetts
Filed Jan. 7, 1958, Ser. No. 707,520
5 Claims. (Cl. 73—453)

This invention relates to measurements and more particularly to a force measuring instrument which utilizes a magnetically suspended element as the sensing device. The apparatus of the invention is particularly useful as a fluid density or velocity measuring instrument.

Specific gravity, or density measurements of fluids such as liquids or gases for example, to detect proportioning of constituents during mixing or progress of chemical reactions or for qualitative evaluation during transfer or storage are frequently required in industrial or scientific processes. Velocity, or rate of motion measurements, and other measurements involving delicate weighing are also frequently required in these processes. In addition to a high order of accuracy, it is desirable that a measuring instrument suitable particularly for industrial purposes be susceptible of automatic and continuous operation, be small enough so as to be readily insertable into process containers or lines or like apparatus to perform the measuring operation and preferably to provide a remote indication. In addition, it is desirable that the instrument be sealed so that it may be easily maintained, and yet that those portions of the instrument in contact with the fluid being measured be accessible for cleaning. It is also desirable that the instrument be tolerant to ambient changes and conditions, including high temperatures and pressures, to provide a highly accurate indication of the specific gravity, density or velocity of the fluid under examination without the necessity of constant adjustment and with a minimum time delay so that a substantially contemporaneous, highly accurate record or control of the specific gravity or the like of a continuous process, for example, may be obtained.

Accordingly, it is an object of this invention to provide a highly accurate indicating instrument particularly adapted for the measurement of the density, specific gravity or velocity of fluids which provides a highly accurate indication of the parameter under examination with a minimum time delay and which is substantially immune to changes in ambient conditions.

It is another object of this invention to provide a fluid density, specific gravity or velocity measuring instrument including a compact probing element which is readily inserted into process tanks or lines or the like contacting the fluid to be measured, and which provides a remote indication of the parameter under examination.

Another object of the invention is to provide a simple sealed probe construction that may be easily disassembled for cleaning and maintenance.

Other objects and advantages of the invention will become apparent from the following description of the preferred embodiment, and from the accompanying drawings, in which:

FIG. 5 is a circuit diagram of the apparatus of the preferred embodiment.

The probe structure, which is inserted into the fluid whose density is to be measured is a compact sealed unit of physically small size which may be hand carried or temporarily or permanently inserted into process containers or lines or the like and is manufactured from suitable materials for withstanding corrosive liquids or solids as well as high temperatures and pressures. In brief, the unit includes a magnetically suspended element in the form of a bob plummet 10, typically, a sphere, whose position is sensed by two sensor coils 12 and 14. The bob 10 is normally suspended by a magnetic field produced by the coil 16 in a location equidistant between the coils 12 and 14.

Coils 12 and 14 are interrelated by electrical circuitry to coil 16 in such a way that if the buoyant effect of the fluid in which the probe is inserted changes, the position of the bob relative to the two sets of coils tends to change. This change is sensed as the inductance in one coil is reduced and the inductance of the other coil is increased due to the shorted turn effect of the bob in the coils. The change, as sensed, is employed to control the magnetic field produced by coil 16 and the bob 10 is repositioned between the coils 12 and 14.

Figure 1:
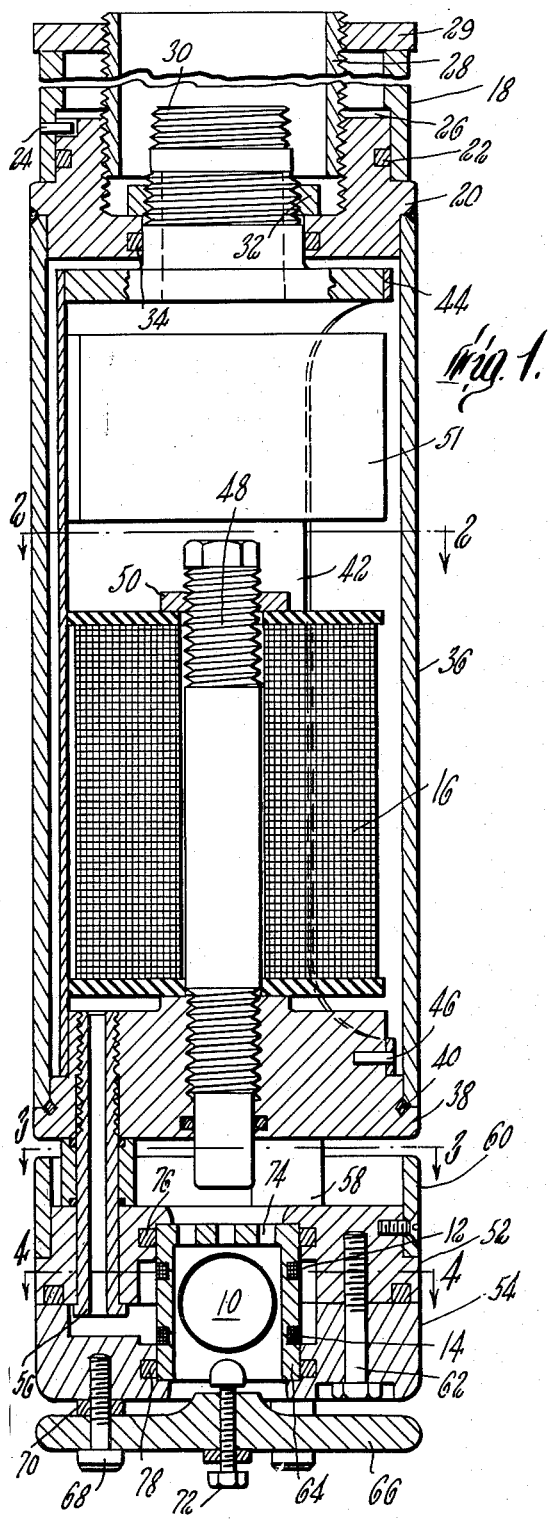
FIG. 1 is a sectional view of the probe structure in the preferred embodiment, showing certain structural features thereof.

With reference to FIG. 1, the probe unit may be supported from a cylindrical support casing or "stem" 18 which may be approximately three inches in diameter. The support casing is fitted over a brass top plug 20 in sealing relationship thereto by means of an O-ring 22 and is held in place by an internal conduit 28 at the upper end of which a nut 29 is tightened. A standard hermetically-sealed multiprong electrical connector 30 is soldered to the threaded top plate 44. By means of a brass nut 32 working on the top plate, the probe internal assembly is held in the probe outer casing 36 and top plug assembly, and is sealed by an O-ring 34.

The outer brass casing 36 is brazed to the top plug 20 at the top, and at the bottom a base member 38 of suitable corrosion-resistant material is maintained in sealing relationship by means of O-ring 40. The base 38 is held in sealing relationship by the cooperation of the tubular chassis 42 which is attached to the threaded top plate 44 at its upper end and at its lower end is attached to the base 38 by means of pins 46, the whole base and chassis subassembly being locked in tension through the action of the nut 32. A pole piece 48 passes through the center of the base 38 and is attached thereto in threaded O-ring sealed relationship. The coil 16, which in the preferred embodiment may have 16,000 turns of number 30 wire, is mounted on the pole piece 48 and is secured thereto by means of nut 50, the top of the pole piece 48 being provided with a hexagonally machined surface to facilitate the positioning of the pole piece 48 in the base member 38.

Figure 2:
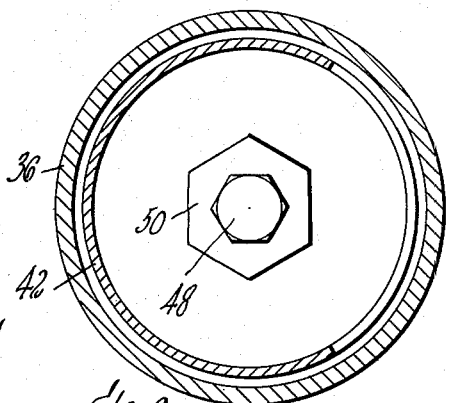
FIG. 2 is a sectional view along the lines 2—2 of FIG. 1.

As seen in FIG. 2, the chassis 42 is cut away on one side so that the coil 16 and pole piece 48 may be easily removed, as well as other electrical elements which are located in the probe as indicated at 51 and hereinafter more fully explained.

Figure 3:
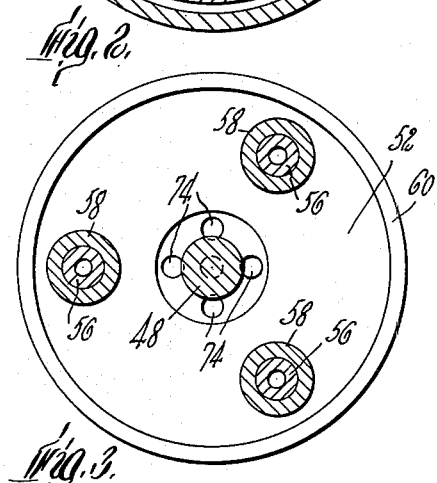
FIG. 3 is a sectional view along the lines 3—3 of FIG. 1.
Figure 4:
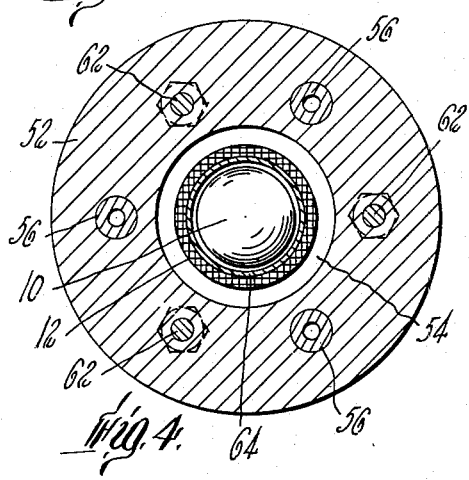
FIG. 4 is a sectional view along the lines 4—4 of FIG. 1.

The bob plummet and sensor coils are mounted beneath the base 38 in a sensor casing which is manufactured in two parts, 52 and 54. The upper portion 52 is attached to the base 38 by means of three stainless steel hollow bolts 56, each cooperating with a spacer 58. A cylindrical baffle structure 60 may be attached typically to the top half of the casing if desired. The relationship of these elements may be seen in FIGS. 1 and 3.

The lower half 54 of the casing is attached in sealing relationship to the upper half 52 by means of three bolts 62. The sensor bobbin 64, in which the two coils 12 and 14 are mounted, is secured between the two halves of the sensor casing. The density sensitive element or bob is positioned within the bobbin 64 and a baffle 66 of suitable material is typically attached to the bottom half of the casing 54 in spaced relation therefrom by means of bolts 68 and spacers 70. A screw-threaded limit adjustment 72 passes through the baffle 66 and provides positioning support for the bob 10 when that bob is not supported by the magnetic field produced by the coil 16.

The bob 10 is free to move within the confines of the bobbin 64 and the fluid into which the probe is inserted may enter into the interior of the bobbin through the holes 74 in the top of the bobbin and beneath between the baffle 66 and the lower half 54 of the sensor casing. Thus, the fluid may readily enter into the bobbin and support the ball plummet or bob 10 but, at the same time, the baffling provided substantially eliminates any distortion in the measurement due to turbulent flow in the fluid under examination.

The sensor coils 12 and 14 are mounted in the outer circumference of the sensor bobbin (which is made of a suitable insulating material) and are sealed from contact with the fluid under examination by means of the O-rings 76 and 78. Leads from the sensor coils 12 and 14 are brought through the stainless steel bolts 56, through the casing 36 and via electrical circuitry at 51 as hereinafter described to the receptacle 30. In a similar manner leads from the coil 16 are brought out through the receptacle 30.

The circuitry of the invention is shown in FIG. 5, those elements within the probe 51 being enclosed within the dotted line. As illustrated, the power supplying and indicating elements are remotely located, as is desirable, with the elements associated with the sensor coils 12 and 14 located within the probe to avoid the necessity of transmitting radio frequency signals of critical phase relation to a remote location. By so doing, remote indicating and controlling installations are made feasible, even under the most difficult conditions.

In accordance with the invention, the bob 10 is suspended by means of the magnet coil 16 which is energized by a conventional D.C. power supply 80, a controlling D.C. amplifier 82 having its plate circuit in series with said coil, a precision resistor 84 with a shunt voltmeter 86 also being in series with said coil. The D.C. amplifier in effect adds or subtracts a correlating signal to coil 16, such signal being fed to the input of said amplifier as derived from the bob sensing elements and their associated circuitry. Such elements include a pair of triodes 90 and 91 operating as a phase sensitive detector to detect any voltage signal from the junction of coils 12 and 14 and present it to the input of D.C. amplifier 82 as a posifier in effect adds or subtracts a correcting signal to the position of the bob, with said triodes and said coils being energized in related phase through a multi-winding transformer by a suitable oscillator 88.

More specifically, oscillator 88, preferably remotely located from the probe is connected to the low impedance primary winding 87 of the transformer, and the opposite ends of coils 12 and 14 are connected to the opposite ends of a grounded center tap secondary winding 89. Individual secondary windings 92 and 93 are provided connected between the grid and cathode of each of triodes 90 and 91, the cathode of triode 90 being connected to the plate of triode 91 at junction 95 and the plate of triode 90 being connected to the cathode of triode 91 at junction 97. The junction of sensing coils 12 and 14 at 13 is connected, through a suitable preamplifier 98 to the input of the phase sensitive detector at junction 95, while the output of said detector at junction 97 is connected to D.C. amplifier 82 at its input. Also, if desired, for ambient temperature compensation purposes, a thermistor 99 may be mounted in the probe and grounded therein, with its other terminal being connected to a suitable tap on calibrated resistor 84.

Preferably, to avoid interaction between the magnetic support of the bob and the action of the sensing coils 12 and 14, oscillator 88 provides an alternating voltage of high enough frequency so that the differential inductance of coils 12 and 14 produced by a displacement of bob 10 results from a shorted turn effect, wherein the bob acts as a shorted secondary winding relative to each of coils 12 and 14 to reduce the inductance of a coil to an increasing degree as it moves into a central position within the coil itself. This is to be contrasted with a differential inductor device operating by the iron core effect, in which the inductance of a coil increases upon movement of the core into the coil. The order of frequency above which the shorted turn effect predominates over the iron core effect is in the vicinity of 100 kc., and it has been found to be desirable to operate oscillator 88 in a range of frequencies from about 350 to 1000 kc., preferably at a frequency of about 500 kc. The use of a sufficiently high oscillator frequency ensures that changes in current flow through magnetic support coil 16 will not be reflected directly in the action of coils 12 and 14 and provides a real advantage in eliminating a source of substantial error. This is particularly important with a unitary sealed probe construction, although with certain arrangements it is not essential so that lower frequencies utilizing the iron core effect are useful with suitable compensation.

As a result of the sensor action, combined with the high order of amplification of the system, the bob 10 is suspended by current flow in suspension coil 16 at an exact and specific position beneath the suspension magnet 48 and between coils 12 and 14, within a few hundred-thousandths of an inch, irrespective of the force necessary to maintain it in such position, so that but minute changes in position are detected to provide a change in force for restoring bob 10 to its central position. Constancy of position is desirable in this application to avoid introducing the variation of suspension current required with varying position, which would have an adverse effect on accuracy. Furthermore, the normal central bob position is maintained by a nominally zero voltage condition at the junction of sensing coils 12 and 14, with displacements of the bob producing variations from zero in opposite senses to provide a restoring action. This latter feature, made possible by the specific bob position at which a balance of inductance is produced between two opposing coils, at once eliminates voltage calibration problems, a tremendous advantage in providing apparatus for industrial applications in particular.

Thus, normally, the remote power supply 80 provides a direct current through coil 16 to suspend the bob 10, the D.C. amplifier 82 in effect increasing or decreasing the current provided by the power supply in amounts necessary to restore the bob and maintain it in its substantially central position. The remote oscillator operates to excite the sensing means including coils 12 and 14 out of phase by 180°. The suspending coil current is indicative of the parameter to be measured, and is measured by voltmeter 86 across calibrated resistor 84, as well as compensating thermistor 99. Such voltmeter, although shown as a simple voltmeter, may of course be more elaborate, and of great resolution and accuracy, and may operate to record or control the process being measured, such instruments being well known in the art.

When the bob 10 is centered between the coils 12 and 14, these coils have equal inductance and the signal from their common connection is at null. However, if the bob is shifted towards one of the coils the inductance thereof is decreased by the shorted turn effect of the bob at the 500 kc. frequency. Likewise the inductance of the other coil is increased and an inductance unbalance is developed. The resulting unbalance produces a signal predominantly of the phase of the excitation of the coil having the lowest inductance at the junction of the two coils. This signal is amplified by preamplifier 98 and applied to the phase sensitive detector. The excitation from the oscillator 88 is at the same time applied to each grid of triodes 90 and 91 in identical phase relationship, and the amplified signal from the sensor coils is applied to the common connection of plate of one triode with the cathode of the other at junction 95. Depending upon the phase of the signal applied to said input junction relatively to the incoming excitation which causes periodic conductive enablement of the two triodes, one or the other of said triodes becomes conductive to provide a D.C. output voltage. Such voltage will be of positive or negative sign, depending upon whether the signal is of positive or negative phase during the conductive portion of the cycle, so that the sign and amplitude of the D.C. output voltage is dependent upon the direction and amplitude of displacement of bob 10. The D.C. output of the detector at 97 which contains sign and magnitude information of the bob displacement is amplified by the D.C. amplifier 82 and thus constantly adjusts the current in the coil 16 to satisfy the need for accurately positioning the bob. In this manner, the ball plummet or bob 10 is returned toward and maintained very closely to its theoretical "null" position between the sensor coils 12 and 14, within a fraction of a ten-thousandth of an inch under normal conditions with a structure as herein described. With liquid surrounding the bob, and producing a buoyant force directly related to its specific gravity or density or velocity, the current required to maintain the ball plummet or bob 10 in this null position is thus directly related to the specific gravity or density or velocity of the fluid under examination, and the magnitude of this current may be calibrated and recorded in a manner well known to the art. It should be noted that the structure of this invention is inherently insensitive to any change in the electrical resistivity of the magnetic coil 16 caused by temperature changes resulting from electrical heating or any other causes. The suspension force is a function of the ampere turns applied to the suspension magnet. As the current is the only variable in this relationship, this value is thus inversely related to the buoyant force of the liquid.

Although the preferred embodiment shown and described herein is particularly adapted for the measurement of specific gravity, density or velocity of fluids such as liquids, this invention is not limited to that application and other uses are contemplated within the spirit and scope of the invention as set forth in the appended claims.

I claim:

1. A force responsive instrument including oscillator means, adjustable current supply means, control means and a probe structure comprising a cylindrical casing, a coil mounted within said casing adjacent said one end thereof being connected to said supply means, a baffle structure positioned adjacent said one end thereof in spaced relationship thereto, a bobbin mounted within said baffle structure, a ball plummet of ferromagnetic material suspended by said coil therebelow, said coil providing the sole electromagnetic suspending force, said plummet adapted to be inserted into said bobbin in limited but freely movable relationship thereto, said bobbin and said baffle structure having a configuration such that said plummet may be immersed in a fluid, plummet position sensing means including a pair of spaced sensing coils connected together at one end thereof and secured to said bobbin, said control means being connected between said connected ends of said coils and said current supply means and being responsive to changes of position of said ball plummet as sensed by said pair of coils, and said oscillator means being connected across the other ends of said coils establishing an alternating voltage thereacross and means responsive to said suspending coil current sensing said force.

2. The force responsive device as claimed in claim 1 wherein said bobbin is in the shape of a cup-like structure having a cylindrical wall and a base, a plurality of apertures in said base, said bobbin positioned such that said base is adjacent said one end of said casing.

3. The force responsive device as claimed in claim 2 wherein said wall has two spaced channels in the outer surface thereof and said sensing coils are disposed in said channels.

4. The force responsive device as claimed in claim 3 wherein said pair of coils are mounted in sealed relationship such that they are isolated from fluid in which said probe may be immersed.

5. The force responsive instrument as claimed in claim 1 wherein said control means includes a phase sensitive detector mounted within said casing.

References Cited in the file of this patent

UNITED STATES PATENTS

| | | |
|---|---|---|
| 1,589,039 | Anschutz-Kaempfe | June 15, 1926 |
| 2,635,461 | Groth et al. | Apr. 21, 1953 |
| 2,691,306 | Beams et al. | Oct. 12, 1954 |
| 2,856,240 | Breazeale et al. | Oct. 14, 1958 |

UNITED STATES PATENT OFFICE

CERTIFICATE OF CORRECTION

Patent No. 2,992,561            July 18, 1961

William G. Burt, Jr.

It is hereby certified that error appears in the above numbered patent requiring correction and that the said Letters Patent should read as corrected below.

Column 3, line 42, for "correlating" read -- correcting --; line 48, for "fier in effect adds or substracts a correcting signal to" read -- tive or negative direct current signal directly related to --.

Signed and sealed this 28th day of November 1961.

(SEAL)
Attest:

ERNEST W. SWIDER
Attesting Officer

DAVID L. LADD
Commissioner of Patents

USCOMM-DC